United States Patent [19]
Ibushuki

[11] Patent Number: 5,515,742
[45] Date of Patent: May 14, 1996

[54] REVERSE GEAR SQUEAL-PREVENTING DEVICE FOR TRANSMISSION

[75] Inventor: Akira Ibushuki, Shizuoka, Japan

[73] Assignee: Suzuki Motor Corporation, Shizuoka, Japan

[21] Appl. No.: 301,188

[22] Filed: Sep. 6, 1994

[30] Foreign Application Priority Data

Sep. 30, 1993 [JP] Japan .................................. 5-268002

[51] Int. Cl.⁶ .............................. F16D 23/06; G05C 5/08
[52] U.S. Cl. ............................. 74/411.5; 74/477; 192/4C
[58] Field of Search .................................. 74/411.4, 477; 192/4C

[56] References Cited

U.S. PATENT DOCUMENTS

| 4,510,819 | 4/1985 | Inui .............................. 74/477 |
| 4,572,020 | 2/1986 | Katayama ................................. 74/477 |
| 4,601,214 | 7/1986 | Fukuchi ................................. 74/477 |
| 4,605,109 | 8/1986 | Fukuchi et al. ........................... 192/4C |
| 4,660,434 | 4/1987 | Inui et al. ................................. 74/477 |

FOREIGN PATENT DOCUMENTS 1-26894  8/1989  Japan .

Primary Examiner—Charles A. Marmor
Assistant Examiner—Troy Grabow
Attorney, Agent, or Firm—Flynn, Thiel, Boutell & Tanis

[57] ABSTRACT

A reverse gear squeal-preventing device for a transmission having a main shaft, a counter shaft, and a reverse idler shaft arranged substantially parallel to each other within a transmission case. The main shaft is provided with forward stage main gears and a reverse main gear. The counter shaft is provided with forward stage counter gears and a reverse counter gear. The reverse idler shaft is provided with a reverse idler gear. A shifting and selecting shaft is controlled by a shift lever to provide axial movement at the time of selecting and pivotal movement at the time of shifting. The shifting and selecting shaft is provided with an interlocking plate for preventing malfunction. There is provided a forward stage-synchronizing mechanism which is actuated at the time of reverse shifting so as to prevent gear squeal. The reverse gear squeal-preventing device includes a cam mounted on the shifting and selecting shaft so as to be rotatable only with respect to a pin that is inserted through said shifting and selecting shaft. A top portion of the cam is brought into and out of engagement with a forward stage-shifting yoke, and the shifting and selecting shaft is provided with a spring for pressing and urging the cam toward the interlocking plate.

1 Claim, 14 Drawing Sheets 5,515,742

REVERSE GEAR SQUEAL-PREVENTING DEVICE FOR TRANSMISSION

FIELD OF THE INVENTION

This invention relates to a reverse gear squeal-preventing device for a transmission and, more particularly, to a reverse gear squeal-preventing device for a selective sliding gear type of manually operated transmission, which squeal-preventing device is simplified in construction but is capable of preventing gears from squealing during reverse shifting.

BACKGROUND OF THE INVENTION

In vehicles, a manually or automatically operated transmission is provided for varying the power of an internal combustion engine to a required level in accordance with running conditions before the power is taken off from the transmission. This type of transmissions may be classed as a gear type transmission, a belt type transmission and the like, among which the gear type transmission prevails because of a reduced loss of power transmission.

The gear type of manually operated transmission includes a speed change gear train having multiple stages. The gear train is shifted using a shift lever so as to provide gear engagement at different stages. The power of the internal combustion engine is thereby varied to a required point in accordance with running conditions. Then, the varied power is taken off from the transmission.

The aforesaid gear type of manually operated transmission may be classified as, for example, a selective sliding gear type, a constant mesh type, and the like, depending on how a speed change ratio is varied.

The selective sliding gear type of manually operated transmission has respective gears mounted on a main shaft, a counter shaft, and a reverse idler shaft. The main shaft is an input shaft which is connected to and disconnected from the internal combustion engine by means of a clutch that is located on the internal combustion engine side. The counter shaft and the reverse idler shaft extend substantially parallel to the main shaft. In order to transmit the power from the internal combustion engine, a reverse idler gear, which is mounted on the reverse idler shaft, is slidingly brought into engagement with a reverse main gear and a sleeve gear which are positioned respectively on the main shaft and the counter shaft. In addition, the transmission is constructed to allow the reverse idler gear to be operational, even when the vehicle remains stationary.

In the constant mesh type of manually operated transmission, pairs of gears corresponding in number to necessary speed change stages are constantly engaged with each other. Further, the transmission is configured to allow for an idle operation between shafts and the gears. In order to transmit torque, the pairs of gears providing required speed change ratios are fixed to the shafts by means of coupling sleeves that are mounted on the shafts.

In the selective sliding gear type of manually operated transmission, the reverse gears are usually operated while the vehicle is stationary. Accordingly, the transmission provides selective sliding engagement of the reverse gears. However, the sleeve gear of the counter shaft, which is at rest, and the main reverse gear of the main shaft, which continues rotating as a result of inertia after the clutch (not shown) is released, are engaged with one another via the reverse idler gear which is slid on the reverse idler shaft. This causes drawbacks of: the occurrence of gear squeal and a concomitant feeling of uncomfortableness; and, possible damage to portions of the gears and a consequential reduction in gear life.

In order to correct the aforesaid shortcomings, it is only necessary to provide the above reverse gears with synchronizing mechanisms as a constant mesh system in a manner similar to the other gears. However, this is disadvantageous from practical and economical viewpoints because of increased weight, a complicated structure, and high cost.

For this reason, a simpler synchronizing mechanism has been used for only stopping the main shaft from rotating before the reverse idler gear is brought into engagement with the sleeve gear.

As one example of such a construction, there is a known system in which one of the forward stage-synchronizing mechanisms, that is, a second speed-synchronizing mechanism, for example, is lightly actuated at the time of, for example, a reverse-shifting operation which is the time when the speed is changed to a reverse stage. The main shaft is thereby stopped from rotating.

In this instance, the second speed-synchronizing mechanism must be actuated temporarily, and must be released before engagement of second speed gears occurs. To this end, a method in common use is that the second speed-synchronizing mechanism is actuated using the resilient force of a spring, and is released by the spring being driven into contact with a stopper for compressing the spring before the gears are engaged with each other.

A conventional transmission will now be described with reference to the drawings. More specifically, FIGS. 22 through 24 illustrate a transmission of a reverse selective sliding gear type in which a reverse gear squeal-preventing mechanism is not provided. In FIG. 22, 202 denotes a detent-type selective sliding gear type of manually operated transmission (hereinafter simply referred to as a transmission). In addition, 204, 206, 208 and 210 respectively denote a gear section, a differential section, a speed change control section, and a transmission case. The transmission case 210 houses the following shafts: a main shaft 212, which is an input shaft for receiving driving power from an internal combustion engine (not shown) connected and disconnected via a clutch (not shown); a counter shaft 214; and a reverse idler shaft 216. These shafts are disposed in a longitudinal direction of the transmission 202, while extending substantially parallel to each other.

The main shaft 212 is rotatably supported by first and second main shaft bearings 222 and 228. The first main shaft bearing 222 is held at a right wall portion 220 of a right case 218 of the transmission case 210. The second main shaft bearing 228 is held at a left wall portion 226 of a left case 224 of the transmission case 210.

The counter shaft 214 is rotatably supported by first and second counter shaft bearings 230 and 232. The first counter shaft bearing 230 is held at the aforesaid right wall portion 220, while the second counter shaft bearing 232 is held at the aforesaid left wall portion 226.

The reverse idler shaft 216 is rotatably supported by the right and left wall portions 220 and 226.

The main shaft 212 has the following gears fixedly mounted thereon in turn from the internal combustion engine side: a first speed main gear 234; a reverse main gear 236; and a second speed main gear 238. Further, the following gears are rotatably positioned in series on the main shaft 212: a third speed main gear 240; a fourth speed main gear 242; and a fifth speed main gear 244 which is located within a side case (not shown) of the transmission case 210.

In addition, the counter shaft 214 is provided with the following gears in turn from the internal combustion engine side: a final-driving gear 248, which forms a final speed reduction mechanism 246; a first speed counter gear 250, which is engaged with the first speed main gear 234; and a second speed counter gear 252, which is engaged with the second speed main gear 238. The final-driving gear 248 is fixed to the counter shaft 214. The first and second speed counter gears 250 and 252 are rotatably mounted on the counter shaft 214. In addition, the following gears are fixedly mounted in sequence on the counter shaft 214: a third speed counter gear 254, which is engaged with the third speed main gear 240; a fourth speed counter gear 256, which is engaged with the fourth speed main gear 242; and a fifth speed counter gear 258, which is engaged with the fifth speed main gear 244 within the side case.

The reverse idler shaft 216 is fitted with a reverse sleeve 260 and a reverse idler gear 262. The reverse idler gear 262 can be engaged with the reverse main gear 236.

The final-driving gear 248 is held in engagement with a final-driven gear 264 which is provided at the differential section 206.

The counter shaft 214 is fitted with a first and second speed sleeve 266 and a sleeve gear 268 between the first speed counter gear 250 and the second speed counter gear 252. The first and second speed sleeve 266 is positioned on the side of the first speed counter gear 250. The sleeve gear 268, which is integral with the first and second speed sleeve 266, is located on the side of the second counter gear 252. The sleeve gear 268 can be engaged with the reverse idler gear 262.

The counter shaft 214 is further provided with a first speed-synchronizing mechanism 270 between the first and second speed sleeve 266 and the first speed counter gear 250. In addition, a second speed-synchronizing mechanism 272 is positioned on the counter shaft 214 between the sleeve gear 268 and the second speed counter gear 252.

The main shaft 212 is fitted with a third and fourth speed sleeve 274 between the third speed main gear 240 and the fourth speed main gear 242.

A third speed-synchronizing mechanism 276 is disposed on the main shaft 212 between the third and fourth speed sleeve 274 and the third speed main gear 240. Further, a fourth speed-synchronizing mechanism 278 is positioned on the main shaft 212 between the third and fourth speed sleeve 274 and the fourth speed main gear 242.

A fifth speed sleeve 280 is positioned on the main shaft 212 adjacent to the fifth speed main gear 244. Further, a fifth speed-synchronizing mechanism 282 is mounted on the main shaft 212 between the fifth speed sleeve 280 and the fifth speed main gear 244.

The speed change control section 208 is provided with a shifting and selecting shaft 284 which is held to the transmission case 210. The shifting and selecting shaft 284 is differently operated via a control shaft (not shown), depending on a controlled state of a shift lever (not shown). That is, the shaft 284 is axially moved at the time of selecting, while being pivoted about an axis of the shaft 284 at the time of shifting.

The shifting and selecting shaft 284 is provided with an interlocking plate 286 for preventing malfunction. A back portion of the interlocking plate 286 is retained by means of a plate-holding bolt 288 in such a manner that the interlocking plate 286 is slidingly movable only in an axial direction of the shifting and selecting shaft 284. The plate-holding bolt 288 is anchored to the transmission case 210.

The interlocking plate 286 is engaged with a first and second speed-shifting yoke 290. The first and second speed-shifting yoke 290 is mounted on a first and second speed-shifting shaft 292. The first and second speed-shifting shaft 292 is provided with a first and second speed fork 294 which is engaged with the previously mentioned first and second speed sleeve 266.

The shifting and selecting shaft 284 is further provided with a gear-shifting arm 296. A distal end portion of the gear-shifting arm 296 is engaged with a reverse-shifting yoke 298. The reverse-shifting yoke 298 is positioned on a fifth speed and reverse-shifting shaft 300. The fifth speed and reverse-shifting shaft 300 is provided with a lever-holding portion 302, at which an intermediate portion of a reverse-shifting lever 304 is retained.

A root end portion of the reverse-shifting lever 304 is pivotably supported by a lever fulcrum portion 306. The lever fulcrum portion 306 is provided on a mounting bracket 308. The mounting bracket 308 is fixedly attached to the transmission case 210. A distal end portion of the reverse-shifting lever 304 is engaged with the aforesaid reverse sleeve 260. In FIG. 22, 310 denotes a detent-type positioning mechanism.

As illustrated in FIG. 22, in the transmission, the reverse idler gear 262 is freely rotatable during a neutral mode. Further, the main shaft 212 continues to rotate under the influence of inertia after the clutch (not shown) is disengaged. However, since the vehicle is stationary, no rotation is imparted to the counter shaft 214 and the final-driving gear 248, both of which are connected to an unillustrated vehicle shaft.

When a reverse-shifting operation is started, an operating force from the shift lever is transmitted to the reverse gear-shifting arm 296 via the reverse-shifting yoke 298. Then, the reverse gear-shifting lever 304 moves the reverse idler gear 262 in the left direction of FIG. 22 and FIG. 23. As shown in FIG. 23, the reverse idler gear 262 is thereby advanced into engagement with the reverse main gear 236. Since the main shaft 212 is still running at this stage, the reverse idler gear 262 is also turned therewith. However, since the reverse idler gear 262 is in a free state, no gear squeal occurs at the time of gear engagement.

However, as shown in FIG. 24, when the reverse gear-shifting arm 296 further continues to push the reverse idler gear 262, the reverse idler gear 262 is brought into contact with the sleeve gear 268 of the counter shaft 214. At this time, the counter shaft 214 is connected to the vehicle shaft (not shown) via the final-driving gear 248. Therefore, the counter shaft 214 is impossible to rotate. As a result, gear squeal may result from contact between the running reverse idler gear 262 and the sleeve gear 268.

In order to prevent the occurrence of gear squeal, methods have been devised for temporarily ceasing the rotation of the main shaft 212 as shown in FIG. 25.

As one of the methods, for example, a mechanism for stopping the rotating main shaft 212, as illustrated in FIG. 25, has been in practical use. That is, the second speed-synchronizing mechanism 272 is actuated by means of a cam mechanism 352 upon the reverse-shifting operation. The rotating main shaft 212 is stopped by a synchronous action that occurs between the second speed counter gear 252, which is rotated on the stationary counter shaft 214, and the counter shaft 214.

In this instance, if the second speed-synchronizing mechanism 272 is excessively operated under the influence of a shifting action at the time of the reverse-shifting operation, the second speed counter gear 252 is thrown into unexpected operation.

In order to avoid such a phenomenon, the second speed-synchronizing mechanism 272 must be released when being actuated to a certain extent.

In addition, it is desirable that the reverse idler gear 262 is freely rotatable the moment the sleeve gear 268 is engaged therewith. That is, the main shaft 212 must be in a free state. This is useful when the reverse idler gear 262 and the sleeve gear 268 assume an out of phase relation, because the reverse idler gear 262 can be turned to match a gear tooth phase so as to engage the sleeve gear 268.

To this end, the interlocking plate 286 for preventing malfunction is usually formed with a cut-out portion 354. The cut-out portion 354 extends within a predetermined range of one surface of the interlocking plate 286. Movement of the second speed-synchronizing mechanism 272 is thereby limited to within the above predetermined range. When the cam mechanism 352 is struck by the cut-out portion 354, a spring 356 of the cam mechanism 352 is yielded and compressed, whereby the second speed-synchronizing mechanism 272 is released.

Further, a synchronizing device for a transmission is disclosed in, for example, Japanese Utility Model Application Examined No. 1-26894. The device disclosed in this publication employs a forward stage-synchronizing mechanism. At the time of reverse shifting, movement of a forward stage fork shaft is limited by a double engagement-preventing member, thereby allowing the forward stage fork shaft to be moved in such a limited path of movement. This arrangement reduces gear squeal during reverse shifting, and improves reverse operability as well.

In conventional types of reverse gear squeal-preventing structures, a second speed-synchronizing mechanism, i.e., a forward stage-synchronizing mechanism, is actuated and released via the resilient force of a spring. This arrangement produces a complicated relationship between spring strength, an operating force, and a synchronous effect. Consequently, it is difficult to decide a proper amount of the strength of the spring. In addition, when a speed change is rapidly performed, sufficient synchronization is impossible to achieve, and a gear squeal occurs. Further, an additional force is required for compressing the spring, thereby making operations heavier.

As a result, in order to transmit forces via the spring, it is necessary to use a spring sufficiently strong with respect to: actuation of the second speed-synchronizing mechanism; friction that occurs at portions of the second speed-synchronizing mechanism; and a positioning mechanism and the like. Furthermore, the operating force must be greater than is necessary in order to compress the spring at a final stage. This causes an inconvenience of reduced operability.

In order to obviate the above-described inconveniences, the present invention provides a reverse gear squeal-preventing device for a transmission having a main shaft, a counter shaft, and a reverse idler shaft arranged substantially parallel to each other within a transmission case, the main shaft being provided with forward stage main gears and a reverse main gear, the counter shaft being provided with forward stage counter gears and a reverse counter gear, and the reverse idler shaft being provided with a reverse idler gear, in which there is provided a shifting and selecting shaft adapted to provide axial movement at the time of selecting and providing pivotal movement at the time of shifting, depending on how a shift lever is controlled, and the shifting and selecting shaft is provided with an interlocking plate for preventing malfunction, whereby a forward stage-synchronizing mechanism is actuated at the time of reverse shifting so as to prevent gear squeal, the reverse gear squeal-preventing device characterized by a cam mounted on the shifting and selecting shaft so as to be only rotatable with respect to a pin that is inserted through the shifting and selecting shaft, a top portion of the cam being brought into and out of engagement with a forward stage-shifting yoke, and the shifting and selecting shaft being provided with a spring for pressing and urging the cam toward the interlocking plate.

Another aspect of the present invention provides a reverse gear squeal-preventing device for a transmission, as aforesaid, having a single cam movement-beveled surface provided at a side portion of the interlocking plate, a single beveled surface-engaging protrusion portion provided on a side surface of the cam for engaging the cam movement-beveled surface.

According to the present invention having the aforesaid structure, a shifting and selecting shaft has a pin inserted therethrough so as to allow a cam to be rotated in relation to the pin. In addition, a cam top portion is driven into and out of engagement with a forward stage-shifting yoke. Gears are thereby prevented from squealing during a shifting operation.

According to another aspect of the present invention having the aforesaid structure, a cam is rotated with respect to a pin which is inserted through a shifting and selecting shaft. A cam movement-beveled surface of an interlocking plate is engaged with a beveled surface-engaging protrusion portion of the cam, and a cam top portion is then disengaged from a forward stage-shifting yoke. Gears are thereby prevented from squealing during a shifting operation.

BRIEF DESCRIPTION OF THE DRAWINGS

An embodiment of the present invention will now be described in specific detail with reference with the drawings wherein.

DETAILED DESCRIPTION

Figure 1:
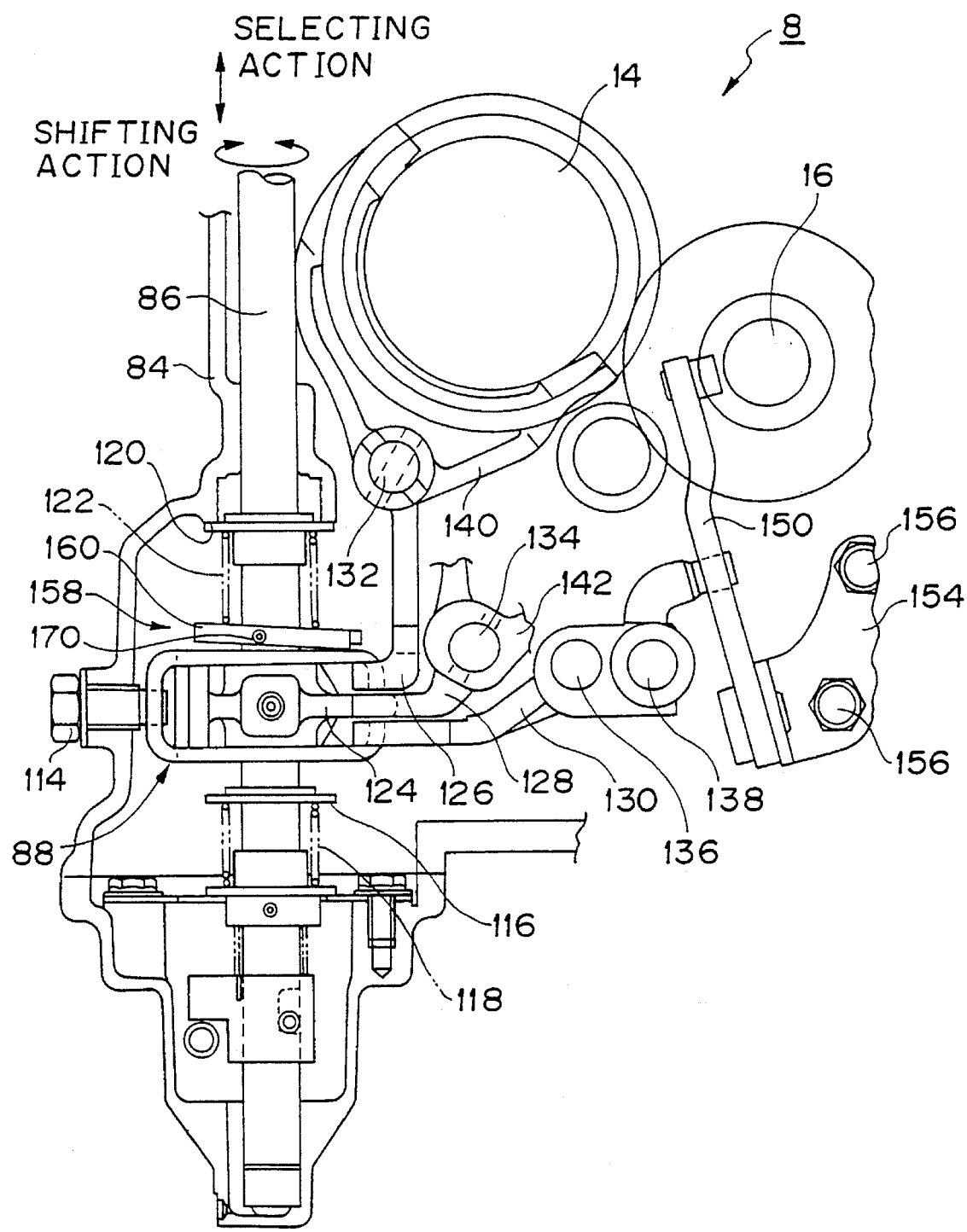
FIG. 1 is a structural view, illustrating a speed change control section.
Figure 6:
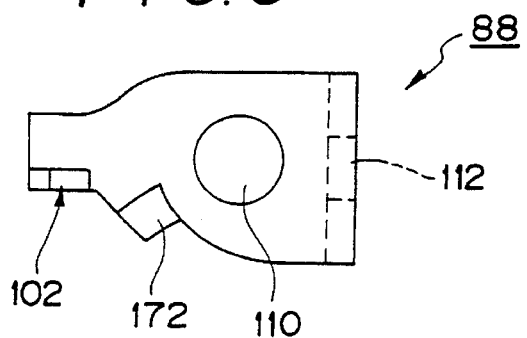
FIG. 6 is a front view of the interlocking plate.
Figure 7:
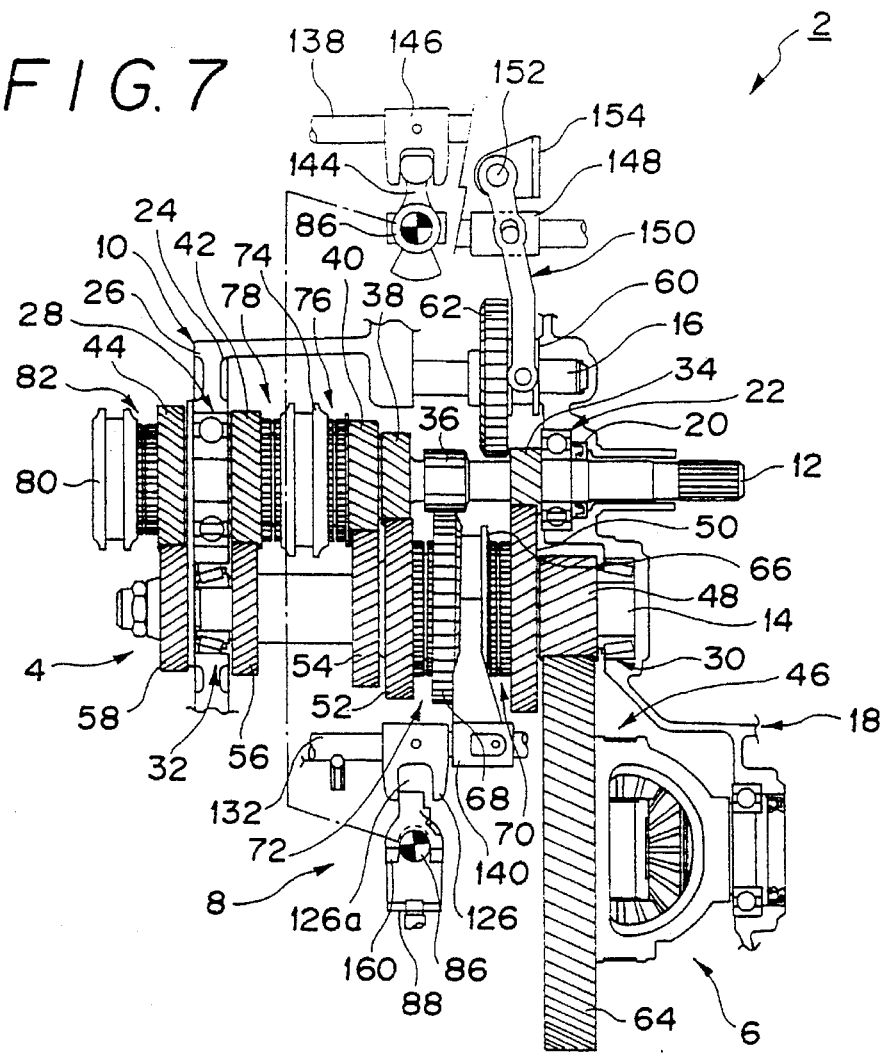
FIG. 7 is a structural view depicting a transmission in a neutral mode.

FIGS. 1 through 20 illustrate the present invention. In FIGS. 1 and 7, reference numeral 2 denotes a selective sliding gear type of manually operated transmission (hereinafter simply called a transmission); 4 a gear portion; 6 a differential portion; 8 a speed change control section; and 10 a transmission case. The transmission case 10 houses the following shafts: a main shaft 12, which is an input shaft receiving driving power from an internal combustion engine (not shown) and is connected and disconnected therefrom via a clutch (not shown); a counter shaft 14; and a reverse idler shaft 16. These shafts are arranged in a longitudinal direction of the transmission 2, while extending substantially parallel to each other.

The main shaft 12 is rotatably supported by first and second main shaft bearings 22 and 28. The first main shaft bearing 22 is held at a right wall portion 20 of a right case 18 of the transmission case 10. The second main shaft bearing 28 is retained at a left wall portion 26 of a left case 24 of the transmission case 10.

The counter shaft 14 is rotatably supported by first and second counter shaft bearings 30 and 32. The first counter shaft bearing 30 is held at the aforesaid right wall portion 20, while the second counter shaft bearing 32 is retained at the aforesaid left wall portion 26.

Further, the reverse idler shaft 16 is rotatably supported by the right and left wall portions 20 and 26.

The main shaft 12 has the following gears fixedly mounted thereon in turn from the internal combustion engine side: a first speed main gear 34; a reverse main gear 36; and a second speed main gear 38. The following gears are rotatably mounted in sequence on the main shaft 12: a third speed main gear 40; a fourth speed main gear 42; and a fifth speed main gear 44, which is positioned within a side case (not shown) of the transmission case 10.

The counter shaft 14 is provided with the following gears in turn from the internal combustion engine side: a final-driving gear 48, which forms a final speed reduction mechanism 46; a first speed counter gear 50, which is engaged with the first speed main gear 34; and a second speed counter gear 52, which is engaged with the second speed main gear 38. The final-driving gear 48 is fixed to the counter shaft 14, while the first and second speed counter gears 50 and 52 are rotatably positioned thereon. In addition, the following gears are fixedly mounted in sequence on the counter shaft 14: a third speed counter gear 54, which is engaged with the third speed main gear 40; a fourth speed counter gear 56, which is engaged with the fourth speed main gear 42; and a fifth speed counter gear 58, which is engaged with the fifth speed main gear 44 within the side case.

The reverse idler shaft 16 is fitted with a reverse sleeve 60 and a reverse idler gear 62. The reverse idler gear 62 can be engaged with the reverse main gear 36.

The final-driving gear 48 is held in engagement with a final-driven gear 64 which is provided at the differential section 6.

A first and second speed sleeve 66 and a sleeve gear 68 are provided on the counter shaft 14 between the first speed counter gear 50 and the second speed counter gear 52. The first and second speed sleeve 66 is positioned on the side of the first speed counter gear 50. The sleeve gear 68, which is integral with the first and second speed sleeve 66, is located on the side of the second counter gear 52. The sleeve gear 68 can be engaged with the reverse idler gear 62.

A first speed-synchronizing mechanism 70 is mounted on the counter shaft 14 between the first and second speed sleeve 66 and the first speed counter gear 50. In addition, a second speed-synchronizing mechanism 72 is provided on the counter shaft 14 between the sleeve gear 68 and the second speed counter gear 52.

A third and fourth speed sleeve 74 is mounted on the main shaft 12 between the third speed main gear 40 and the fourth speed main gear 42.

In addition, a third speed-synchronizing mechanism 76 is disposed on the main shaft 12 between the third and fourth speed sleeve 74 and the third speed main gear 40. Further, a fourth speed-synchronizing mechanism 78 is mounted on the main shaft 12 between the third and fourth speed sleeve 74 and the fourth speed main gear 42.

Moreover, a fifth speed sleeve 80 is positioned on the main shaft 12 adjacent to the fifth speed main gear 44. A fifth speed-synchronizing mechanism 82 is mounted on the main shaft 12 between the fifth speed sleeve 80 and the fifth speed main gear 44.

Referring to FIG. 1, the speed change control section 8 is shown provided with a shifting and selecting shaft 86. The shaft 86 is held to a shaft-holding portion 84 of the transmission case 10. The shifting and selecting shaft 86 provides different actions via a control shaft (not shown) depending upon a controlled state of a conventional shift lever (not shown). That is, the shaft 86 is axially moved upon a selecting operation, and is pivoted about an axis of the shaft 86 upon a shifting operation.

Figure 4:
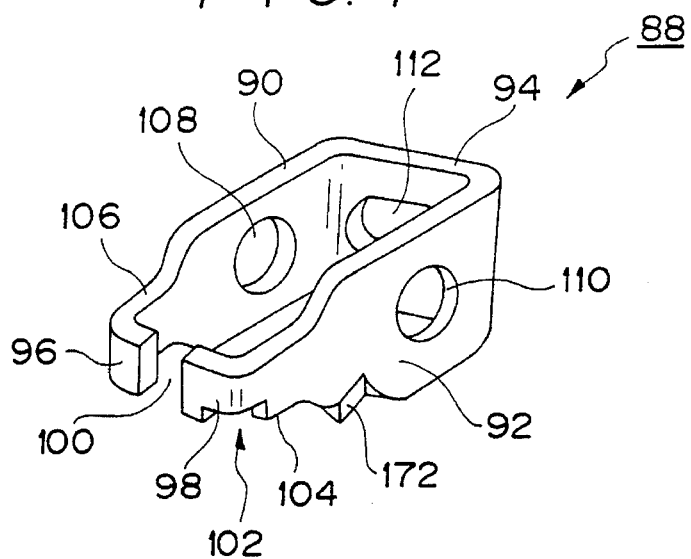
FIG. 4 is a perspective view of an interlocking plate.
Figure 5:
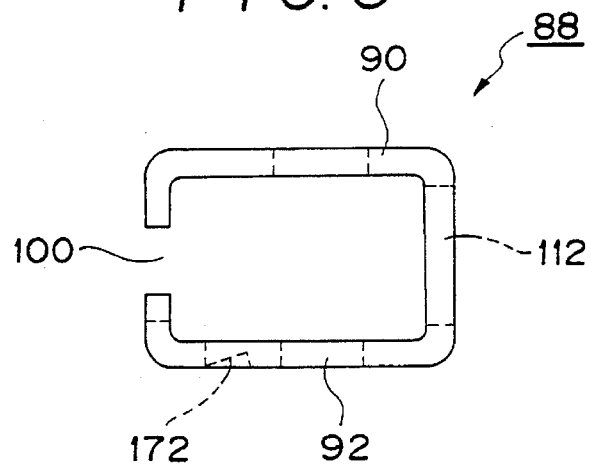
FIG. 5 is a plan view of the interlocking plate.

The shifting and selecting shaft 86 is provided with an interlocking plate 88 for preventing malfunction. As illustrated in FIGS. 4 through 6, the interlocking plate 88 is formed in a C-shaped configuration. The interlocking plate 88 consists of: a first side portion 90; a second side portion 92, which opposes the first side portion 90; a back portion 94, which interconnects respective ones of ends of the first and second side portions 90 and 92; a first guide portion 96, which is folded at the other end of the first side portion 90; and a second guide portion 98, which is folded at the other end of the second side portion 92. A lever groove 100 is formed between the first and second guide portions 96 and 98. The second guide portion 98 is formed with a cut-out portion 102. In order to provide reduced widths of the first and second side portions 90 and 92, the first side portion 90 has a first indented edge surface 106 formed on the side of the first guide portion 96, while the second side portion 92 is defined with a second indented edge surface 104 on the side of the second guide portion 98. Further, the first and second side portions 90 and 92 are respectively formed with first and second aligned shaft holes 108 and 110, through which the shifting and selecting shaft 86 is inserted. The back portion 94 is defined with a bolt insertion hole 112 in the form of an elongated slot.

The interlocking plate 88 is supported by the shifting and selecting shaft 86 being inserted through the first and second shaft holes 108 and 110 and further by a distal end portion of a plate-holding bolt 114 (FIG. 1) being inserted through the elongated slot 112. The plate-holding bolt 114 is mounted on the transmission case 10.

The shifting and selecting shaft 86 is provided with a first spring support 116 on one side of the interlocking plate 88, i.e., on a lower side in FIG. 1. The first spring support 116 is spaced apart from the interlocking plate 88. The first spring support 116 has ends of first return springs 118 held thereagainst. The first return springs 118 serve as positioning springs, and are positioned around the shifting and selecting shaft 86.

In addition, a second spring support 120 is provided on an end surface of the shaft-holding portion 84 on the other side of the interlocking plate 88, i.e., on an upper side in FIG. 1. The second spring support 120 has ends of second return springs 122 held thereagainst. The second return springs 122 are positioned around the shifting and selecting shaft 86.

One end of a shifting and selecting lever 124 is attached to the shifting and selecting shaft 86 within the interlocking plate 88. The other end of the shifting and selecting lever 124 is brought into selective engagement with: a first and second speed-shifting yoke 126; a third and fourth speed-shifting yoke 128; and a fifth speed and reverse-shifting yoke 130.

The first and second speed-shifting yoke 126 is mounted on a first and second speed-shifting shaft 132. The third and fourth speed-shifting yoke 128 is mounted on a third and fourth speed-shifting shaft 134. The fifth speed and reverse-shifting yoke 130 is mounted on a fifth speed and reverse-shifting shaft 136 and a fifth speed and reverse-guiding shaft 138.

The first and second speed-shifting shaft 132 is provided with a first and second speed fork 140 which is engaged with the aforesaid first and second speed sleeve 66. The third and fourth speed-shifting shaft 134 is fitted with a third and fourth speed-shifting fork 142 which is engaged with the aforesaid third and fourth speed sleeve 74. The fifth speed and reverse-shifting shaft 136 has a fifth speed fork (not shown) engaged with the aforesaid fifth speed sleeve 80.

The shifting and selecting shaft 86 has a gear-shifting arm 144 mounted thereon. A distal end portion of the gear-shifting arm 144 is engaged with a reverse-shifting yoke 146. The reverse-shifting yoke 146 is positioned on the fifth speed and reverse-shifting shaft 136. The fifth speed and reverse-shifting shaft 136 is defined with a lever-holding portion 148, at which an intermediate portion of a reverse-shifting lever 150 is retained.

The reverse-shifting lever 150 is pivotally supported at a root end portion thereof by a level fulcrum portion 152. The lever fulcrum portion 152 is provided on a mounting bracket 154. The mounting bracket 154 is fixedly attached to the transmission case 10 by means of fixing bolts 156. A distal end portion of the reverse-shifting lever 150 is engaged with the aforeaid reverse sleeve 60.

Further, the shifting and selecting shaft 86 is provided with a gear squeal-preventing mechanism 158 on the other side of the interlocking plate 88. The gear squeal-preventing mechanism 158 is operated by actions of the interlocking plate 88. The gear squeal-preventing mechanism 158 includes a cam 160.

Figure 2:
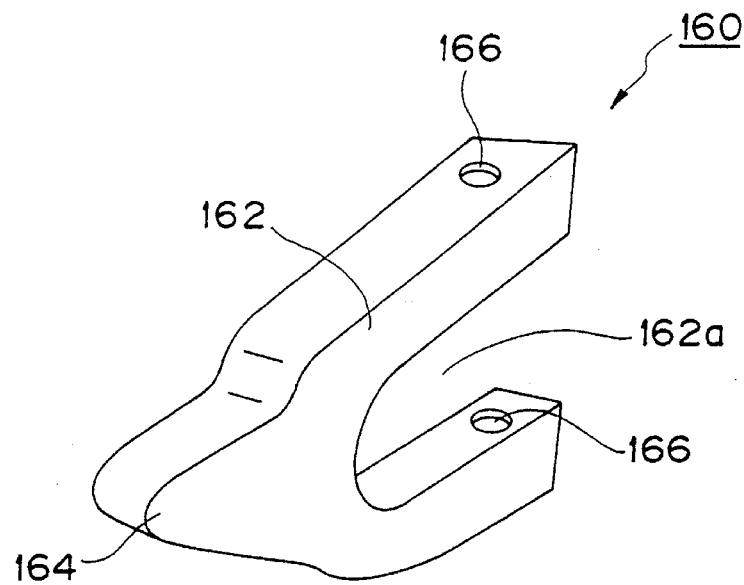
FIG. 2 is a perspective view of a cam.
Figure 3A:
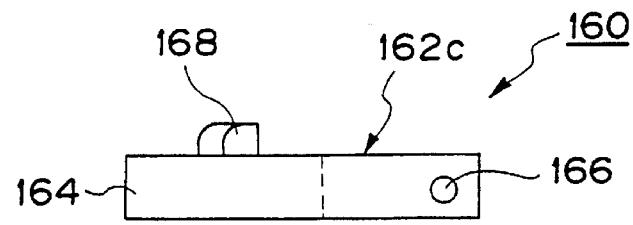
FIG. 3A is a front view of the cam.
Figure 3B:
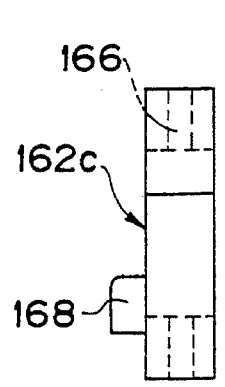
FIG. 3B is a plan view of the cam.
Figure 3C:
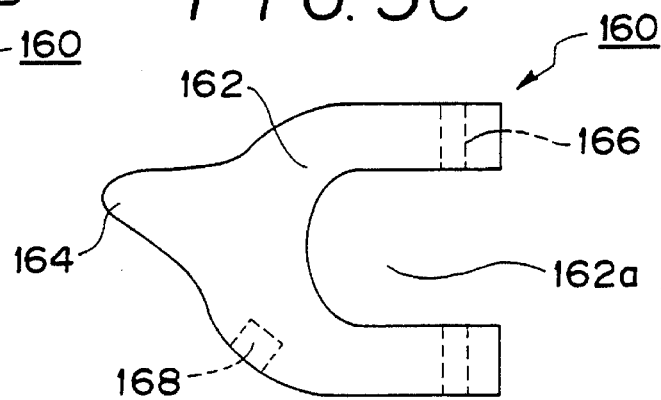
FIG. 3C is a left side view of the cam.

As shown in FIG. 2 and FIG. 3, the cam 160 includes a U-shaped cam base portion 162 and a cam top portion 164. The cam base portion 162 is formed with a shaft insertion portion 162a at a central portion thereof. The cam base portion 162 further has through-holes 166 defined through both end portions thereof. In addition, a single beveled surface-engaging protrusion portion 168 is formed on one surface 162c of the cam base portion 162. The beveled surface-engaging protrusion portion 168 is located at a peripheral portion of the cam 160.

When the cam 160 is attached to the shifting and selecting shaft 86, a pin 170 is inserted through the through-holes 166. The cam 160 is thereby fixed to the shaft 86.

Referring back to FIGS. 4 through 6, the second side portion 92 of the interlocking plate 88 is shown formed with a single cam movement-beveled surface portion 172 for engaging the beveled surface-engaging protrusion portion 168 in order to form the gear squeal-preventing mechanism 158.

The other ends of the second return springs 122 urge the cam 160 to press against the second side portion 92 of the interlocking plate 88.

As shown in FIG. 7, the cam top portion 164 of the cam 160 is engaged with a first and second speed yoke-engaging groove 126a of the first and second speed-shifting yoke 126, together with the interlocking plate 88.

Next, the operation of the present embodiment will be briefly described.

Figure 8:
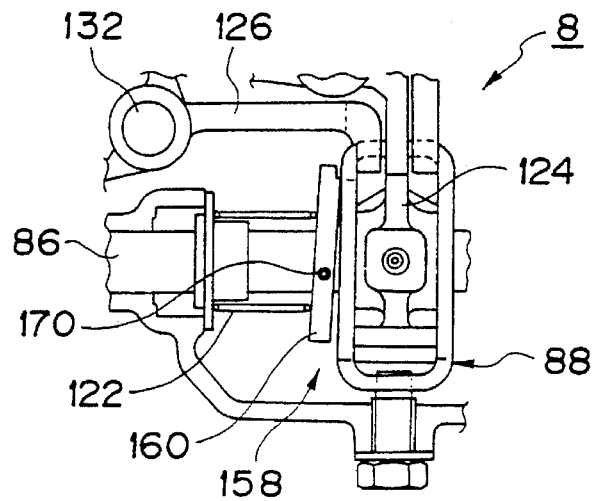
FIG. 8 is a structural view showing the speed change control section in the neutral mode.

As illustrated in FIGS. 7 and 8, when the transmission 2 is in a neutral state, the main shaft 12 is run by driving power from an internal combustion engine. However, the counter shaft 14 remains stationary because the vehicle is at rest.

Figure 9:
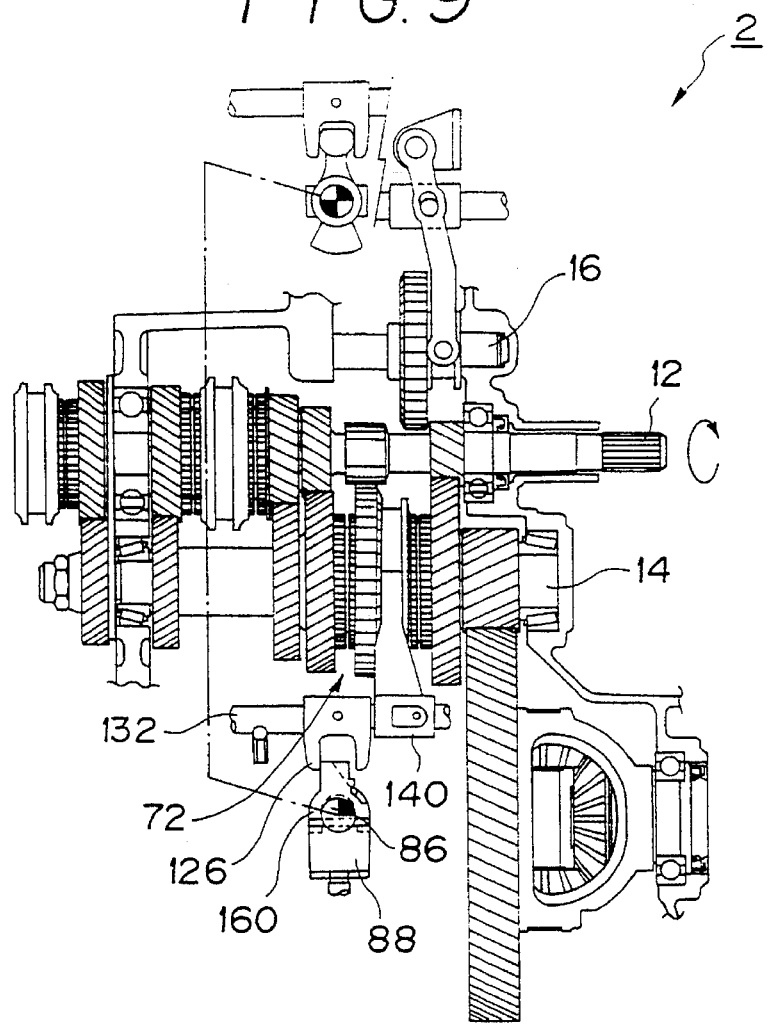
FIG. 9 is a view showing the transmission in a state where a cam top portion is engaged with a first and second speed-shifting yoke.
Figure 10:
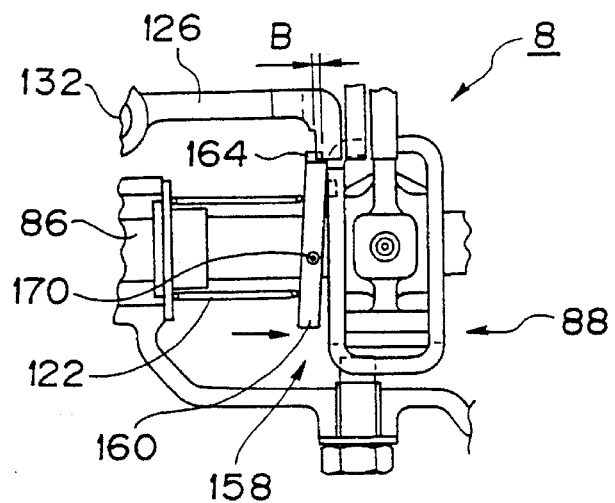
FIG. 10 is a view showing the speed change control section in a state where the cam top portion is engaged with the first and second speed-shifting yoke.
Figure 11:
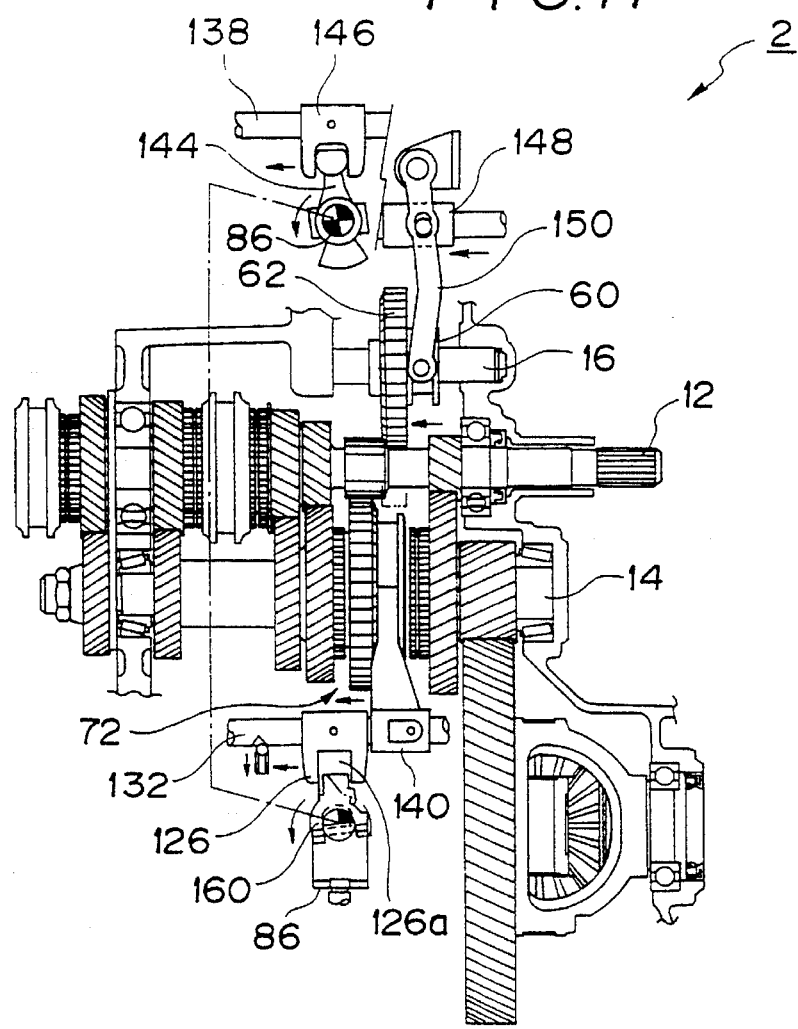
FIG. 11 is a view showing the transmission at the time of reverse shifting.
Figure 17:
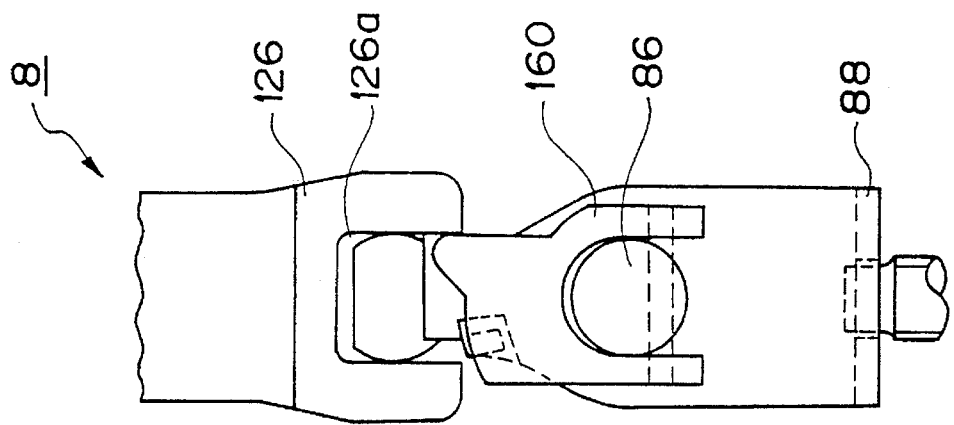
FIG. 17 is a view showing the speed change control section in a neutral position.
Figure 18A:
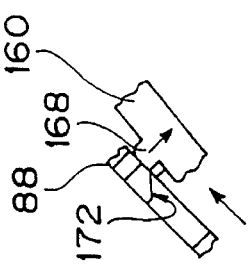
FIG. 18A is a fragmentary side view thereof.

When a selecting operation is performed from a neutral position as shown in FIG. 17 to a reverse position, the shifting and selecting shaft 86 is axially moved jointly with the interlocking plate 88. At this time, as shown in FIGS. 9 and 10, the cam top portion 164 of the cam 160 is moved to a position at which the cam top portion 164 is engaged with the first and second speed-shifting yoke 126. (See FIG. 16.)

Then, a clutch (not shown) is released to perform a reverse-shifting operation. The released clutch isolates the main shaft 12 from the driving power of the internal combustion engine. However, the main shaft 12 thereafter continues rotating with the aid of inertia.

Figure 12:
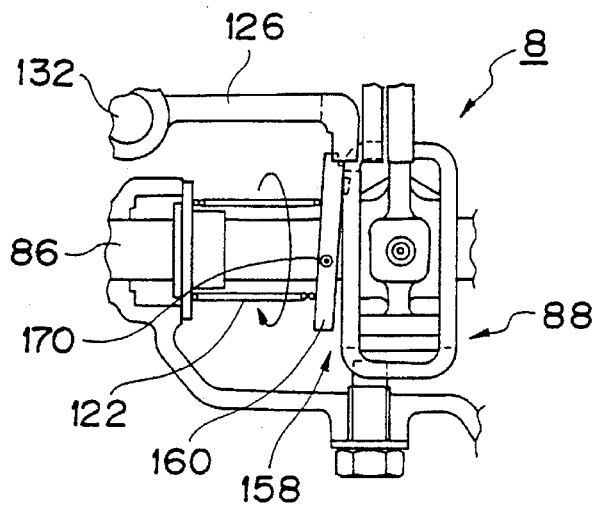
FIG. 12 is a view showing the speed change control section at the time of reverse shifting.

As shown in FIG. 12, the reverse-shifting operation causes the shifting and selecting shaft 86 to be turned in the direction of an arrow.

The turning of the shifting and selecting shaft 86 causes the reverse-shifting gear arm 144 to push the reverse-shifting yoke 146. This movement of the reverse-shifting yoke 146 actuates the reverse-shifting lever 150. The reverse idler gear 62 is thereby driven into engagement with the reverse main gear 36.

The cam 160 is also turned in the same direction as the shifting and selecting shaft 86 as a result of the presence of the pin 170. The cam top portion 164 of the cam 160 thereby pushes the first and second speed-shifting yoke 126 toward the second speed counter gear 52. As a result, the second speed-synchronizing mechanism 72 starts operation, and the main shaft 12 begins synchronizing with the counter shaft 14. This means that rotation of the main shaft 12 is decelerated.

When the reverse-shifting operation is further continued, an increase in the relative angle between the cam 160 and the interlocking plate 88 causes the beveled surface-engaging protrusion portion 168 of the cam 160 to be turned on the shifting and selecting shaft 86. More specifically, the aforesaid protrusion portion 168 is moved with respect to the pin 170 in a clockwise direction of FIG. 14 along the cam movement-beveled surface 172 (see FIGS. 19 and 20). When a rotational amount of the cam 160 is brought to a level corresponding to a width B (FIG. 10) of engagement between the cam 160 and the first and second speed-shifting yoke 126, the cam 160 is disengaged from the first and second-shifting yoke 126. The first and second speed-shifting yoke 126 is then sprung back to a neutral position by the second return springs 122.

Thereafter, the cam 160 continues to rotate in union with the shifting and selecting shaft 86 through speed change control. However, since the cam top portion 164 of the cam 160 is spaced apart from the first and second speed-shifting yoke 126, the beveled surface-engaging protrusion portion 168 rides on the cam movement-beveled surface 172, and merely rotates on a plane of a side surface of the interlocking plate 88 (see FIGS. 20 and 20A). At this time, the main shaft 12 has already been decreased in rotational speed to a sufficient level, or has been stopped from rotating.

Figure 13:
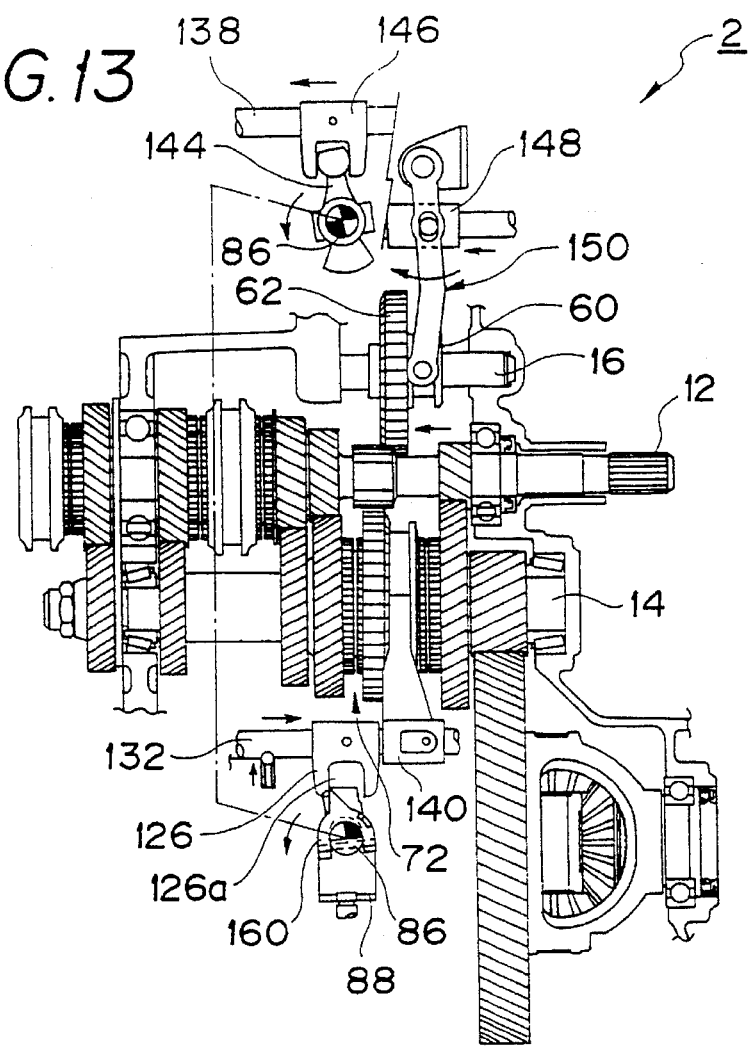
FIG. 13 is a view showing the transmission in a state of continued reverse shifting.
Figure 14:
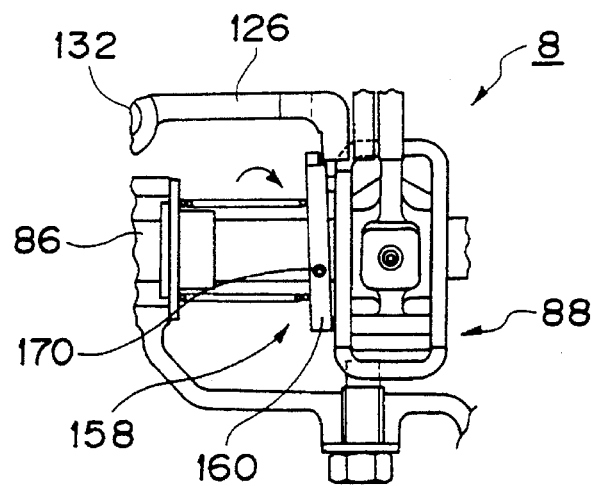
FIG. 14 is a view showing the speed change control section in the state of continued reverse shifting.

As a result, even when speed change control is further continued, as shown in FIGS. 13 and 14, an unpleasant gear squeal can be avoided at the time of engagement of the reverse idler gear 62 with the reverse main gear 36.

Since the second speed-synchronizing mechanism 72 has already ceased operation, free rotation of the main shaft 12 is impossible. Further, even when respective apex portions of the reverse idler gear 62 and the reverse main gear 36 are brought into contact with each other, the reverse main gear 36 is slightly rotatable. Consequently, it is possible to achieve smooth engagement between the reverse idler gear 62 and the reverse main gear 36.

Figure 15:
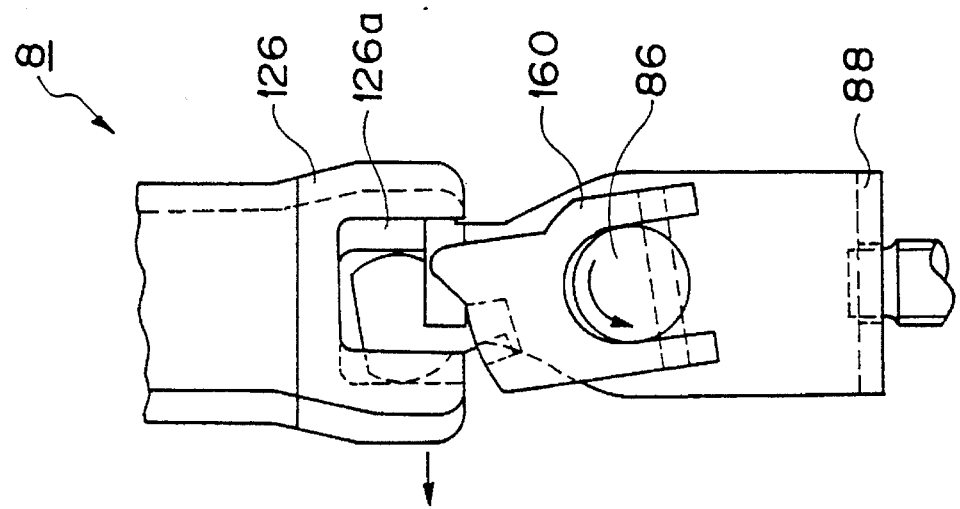
FIG. 15 is a view showing the speed change control section at the time of shifting to a fifth speed.
Figure 16:
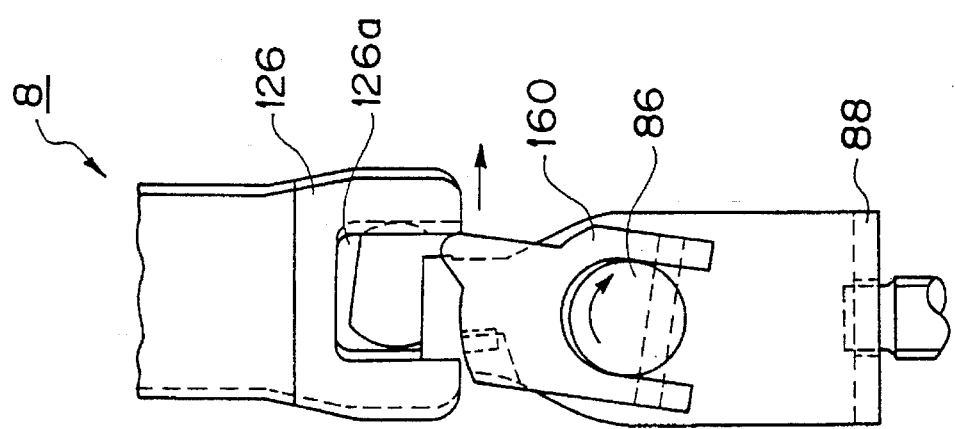
FIG. 16 is a view showing the speed change control section at the time of performing shifting to a reverse speed.

As shown in FIG. 15, when shifting to a fifth speed is performed from a state of a neutral position as shown in FIGS. 9, 10, and 17, the cam 16 is moved only within the first and second speed yoke-engaging groove 126a of the first and second speed-shifting yoke 126. As a result, no influences are exercised on other shifting systems.

Furthermore, when shifting to second and fourth speeds is performed from a state of the neutral position as shown in FIGS. 9, 10, and 17, the cam movement-beveled surface 172 of the interlocking plate 88 pushes the cam 160 because the cam top portion 164 of the cam 160 has been disengaged from the first and second speed-shifting yoke 126. Then, the cam 160 merely compresses the second return springs 122 to a small degree without yielding any other influences.

When shifting to first and third speeds is performed, no influence occurs because the cam 160 does not abut the cam movement-beveled surface 172.

Figure 19A:
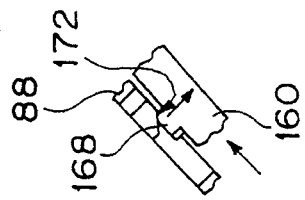
FIG. 19A is a fragmentary side view thereof.
Figure 20A:
FIG. 20A is a fragmentary side view thereof.
Figure 18:
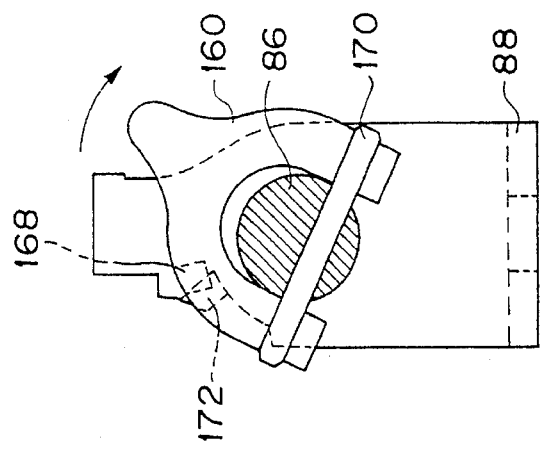
FIG. 18 is a view showing a beveled surface-engaging protrusion portion and a cam movement-beveled surface in a neutral state.
Figure 19:
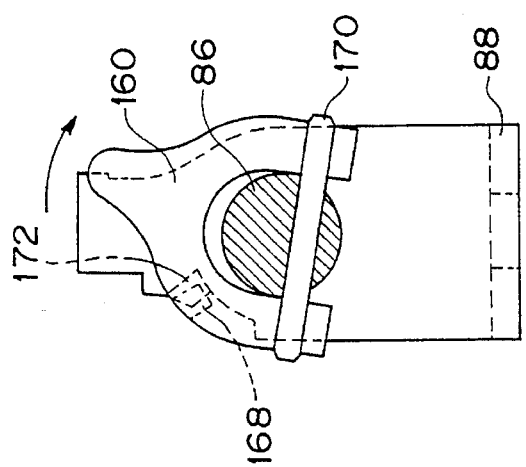
FIG. 19 is a view showing a state in which the beveled surface-engaging protrusion portion is in contact with the cam movement-beveled surface.
Figure 20:
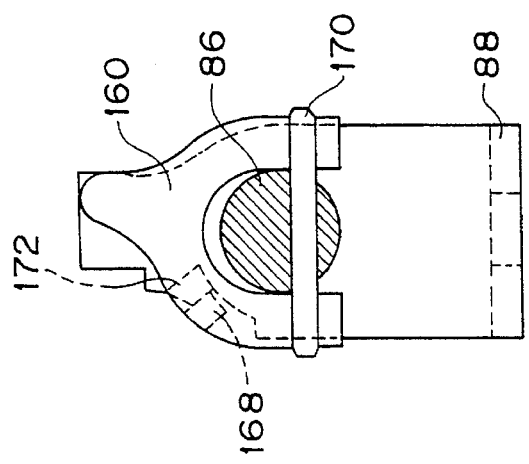
FIG. 20 is a view showing the cam in a disengaged state.

FIGS. 18 through 20 and 18A through 20A illustrate a detailed state of engagement between the beveled surface-engaging protrusion portion 168 and the cam movement-beveled surface 172. In a neutral state shown in FIGS. 18 and 18A, the beveled surface-protruding portion 168 is out of engagement with the cam movement-beveled surface 172. At the time of actuation shown in FIGS. 19 and 19A, the aforesaid two components are in contact with one another. FIGS. 20 and 20A depict the beveled surface-engaging protrusion portion 168 in a state of riding on the cam movement-beveled surface 172, and illustrate the cam 160 in a disengaged state.

In conclusion, during reverse shifting, a relationship to the second speed-synchronizing mechanism 72, i.e., a forward state-synchronizing mechanism, is maintained and interrupted by the use of a change in an angle between the cam 160 and the interlocking plate 88, the cam 160 being rotated on the shifting and selecting shaft 86 with respect to the pin 170. Accordingly, it is possible to cope with a quicker reverse-shifting operation, and to effectively prevent the occurrence of gear squeal. Further, the gear squeal-preventing device 158 can employ a second return spring, i.e., a spring for selective return, which is originally provided as the second return spring 122 within the transmission 2 of the type described herein. There is no need for addition of components except for the pin 170 and the cam movement-beveled surface 172 of the interlocking plate 88. As a result, such a single structure can prevent gear squeal during reverse shifting.

Furthermore, the shafts need not be lengthened, and synchronizing or other gears need not be added. Consequently, the transmission 2 can be designed to have fewer components as well as a reduced overall size and lighter weight.

In addition, a dedicated linking mechanism need not be added, which facilitates assembly.

Furthermore, the second speed-synchronizing mechanism 72 is rendered operative without the use of resilient elements such as springs. As a result, reliable synchronization is achievable, and the gears can even be prevented from squealing at the time of quicker actions.

Moreover, since a dedicated operating surface is used to release the second speed-synchronizing mechanism 72, influences such a component accuracy and friction can be reduced.

Yet further, even for transmissions of types in which a gear squeal-preventing device is not provided, the gear squeal-preventing device 158 according to the present embodiment can easily be installed therein. This feature can enhance compatibility.

Still further, since lower cost can be maintained with fewer components, this is advantageous from an economical standpoint.

Needless to say, the present invention is not limited to the above-described embodiment, but is susceptible to various applications and modifications.

Figure 21:
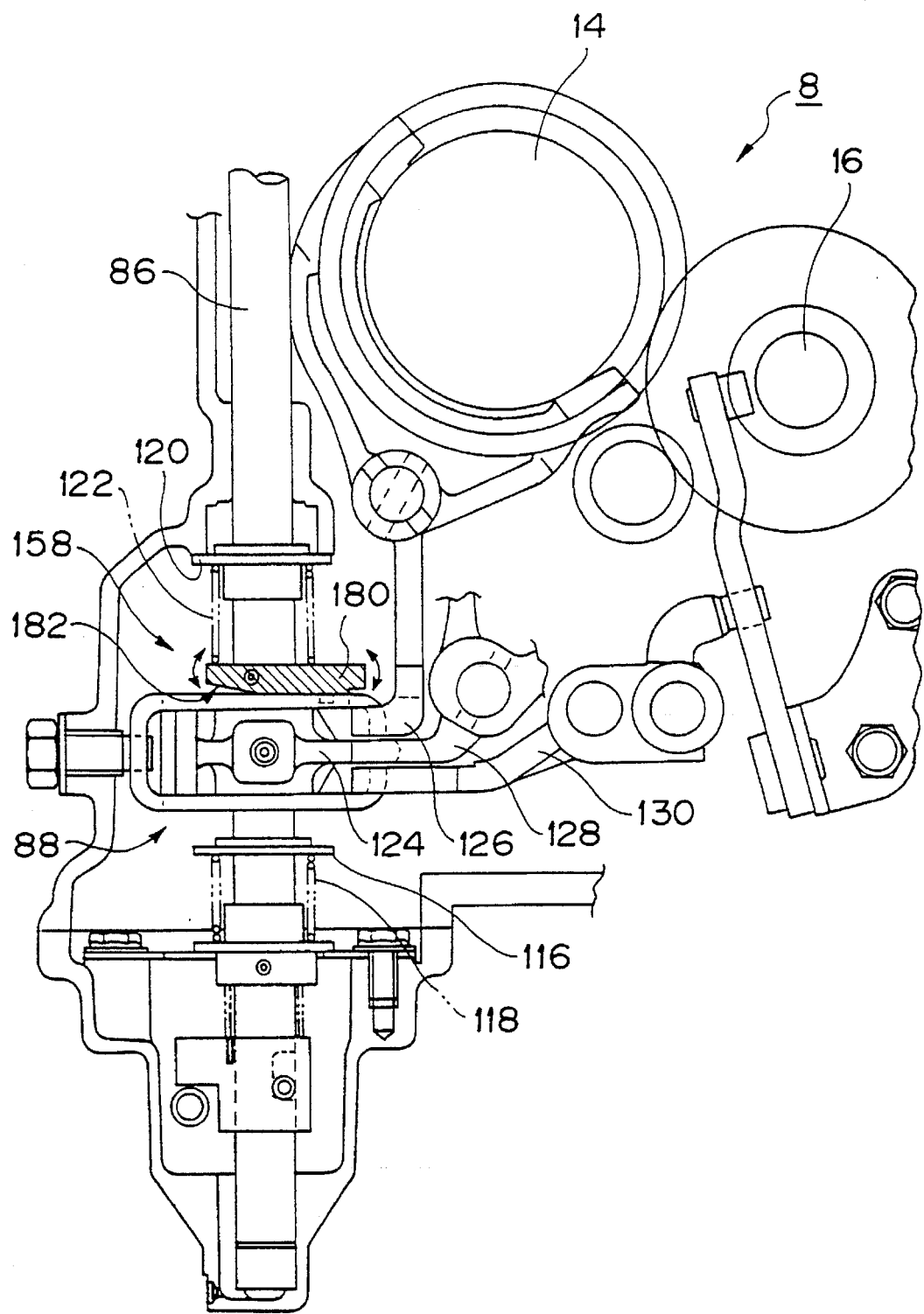
FIG. 21 is a view showing a speed change control section according to another embodiment of the present invention.
Figure 22:
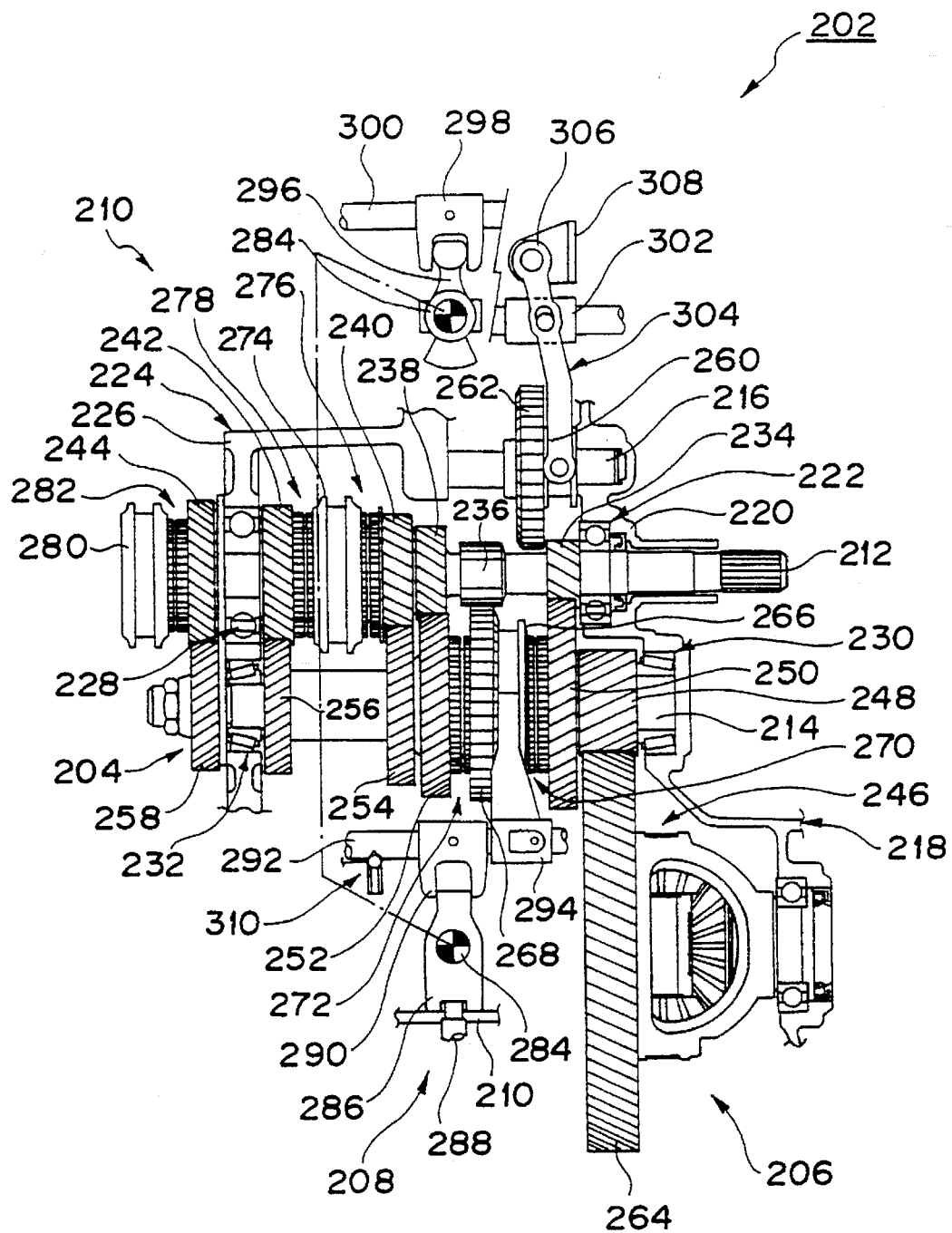
FIG. 22 is a view showing a transmission according to the prior art.
Figure 23:
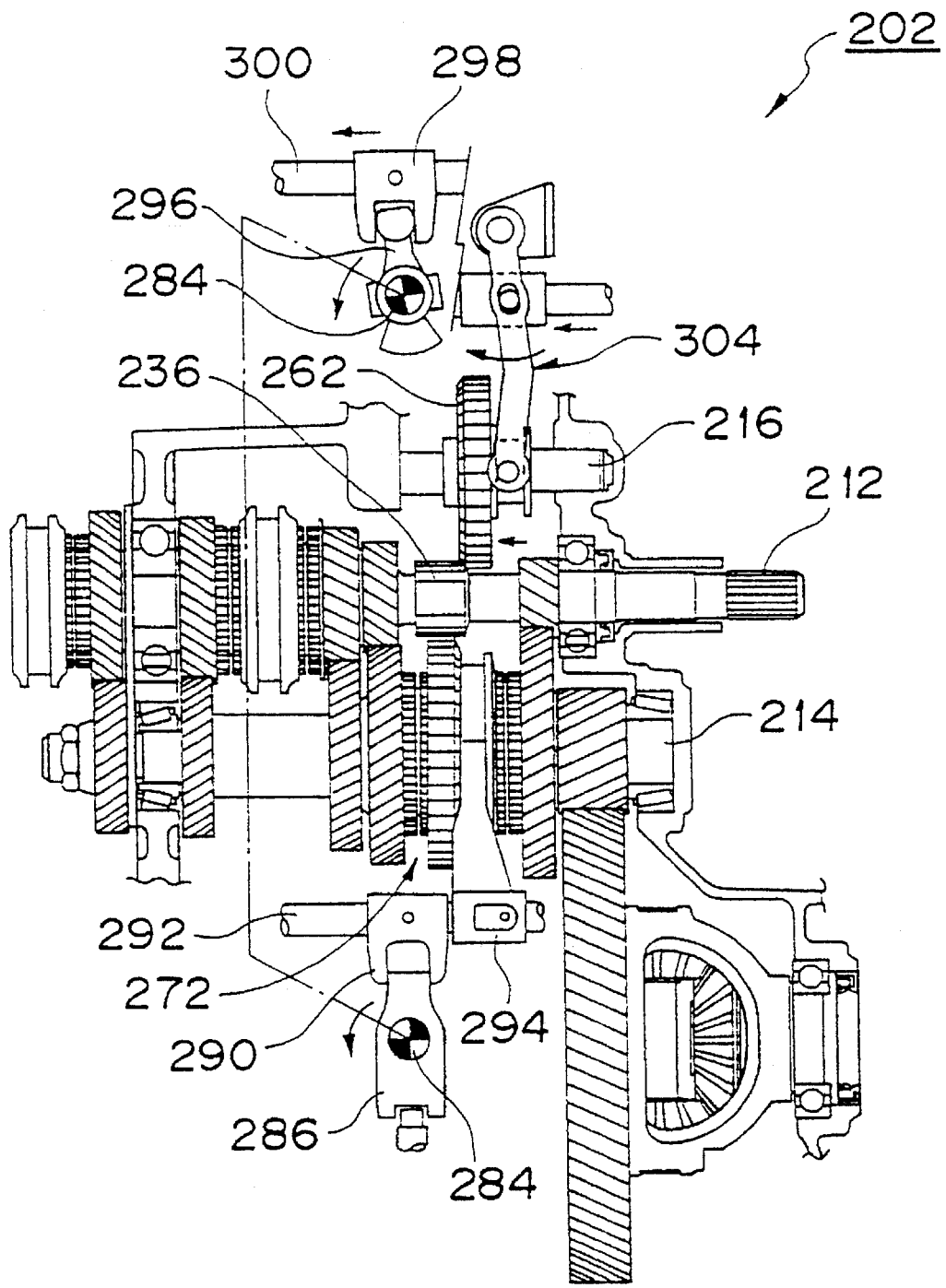
FIG. 23 is a descriptive illustration showing the transmission of FIG. 22 at the time of reverse shifting.
Figure 24:
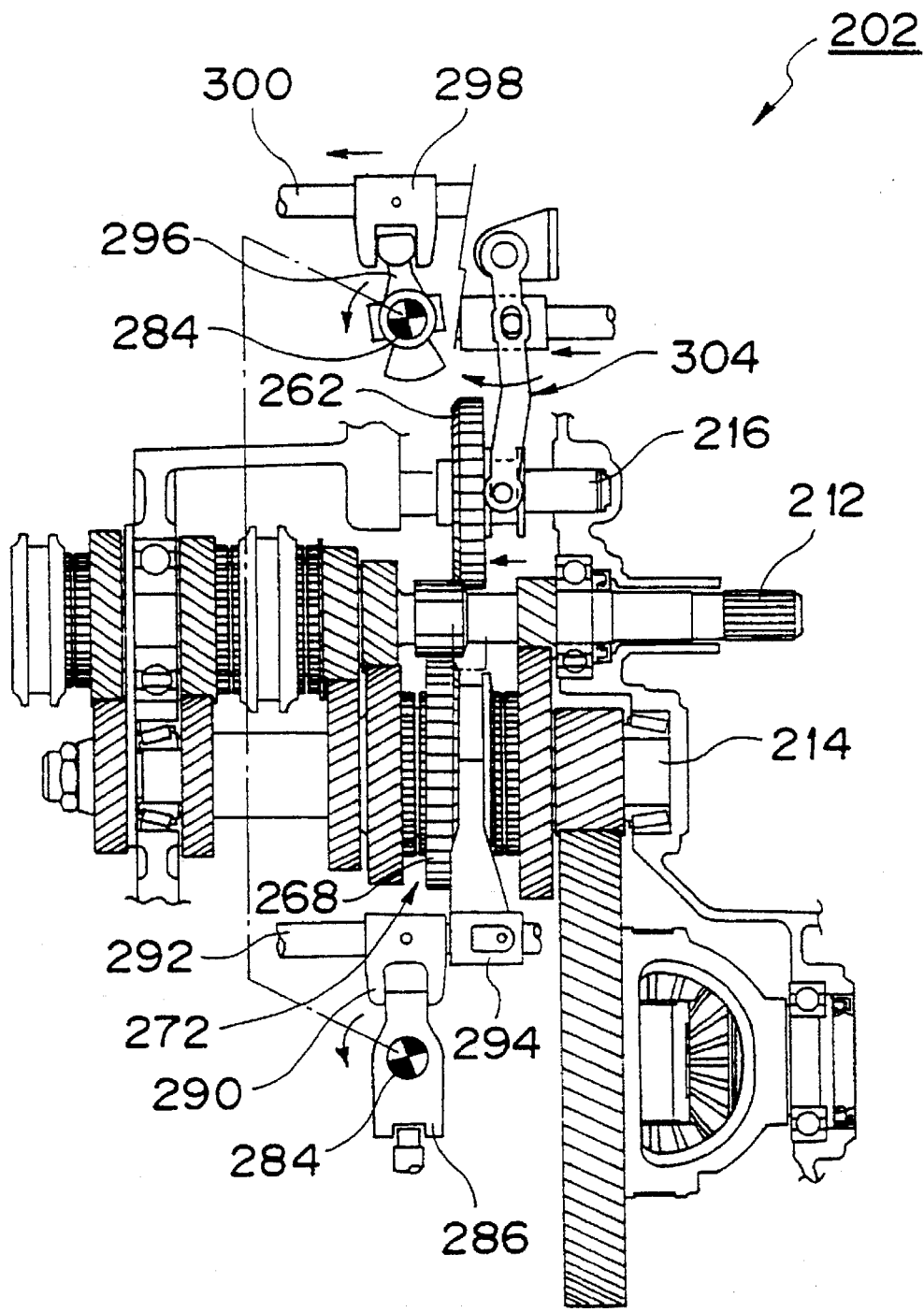
FIG. 24 is a descriptive illustration showing the transmission of FIG. 22 at the time of reverse shifting.
Figure 25:
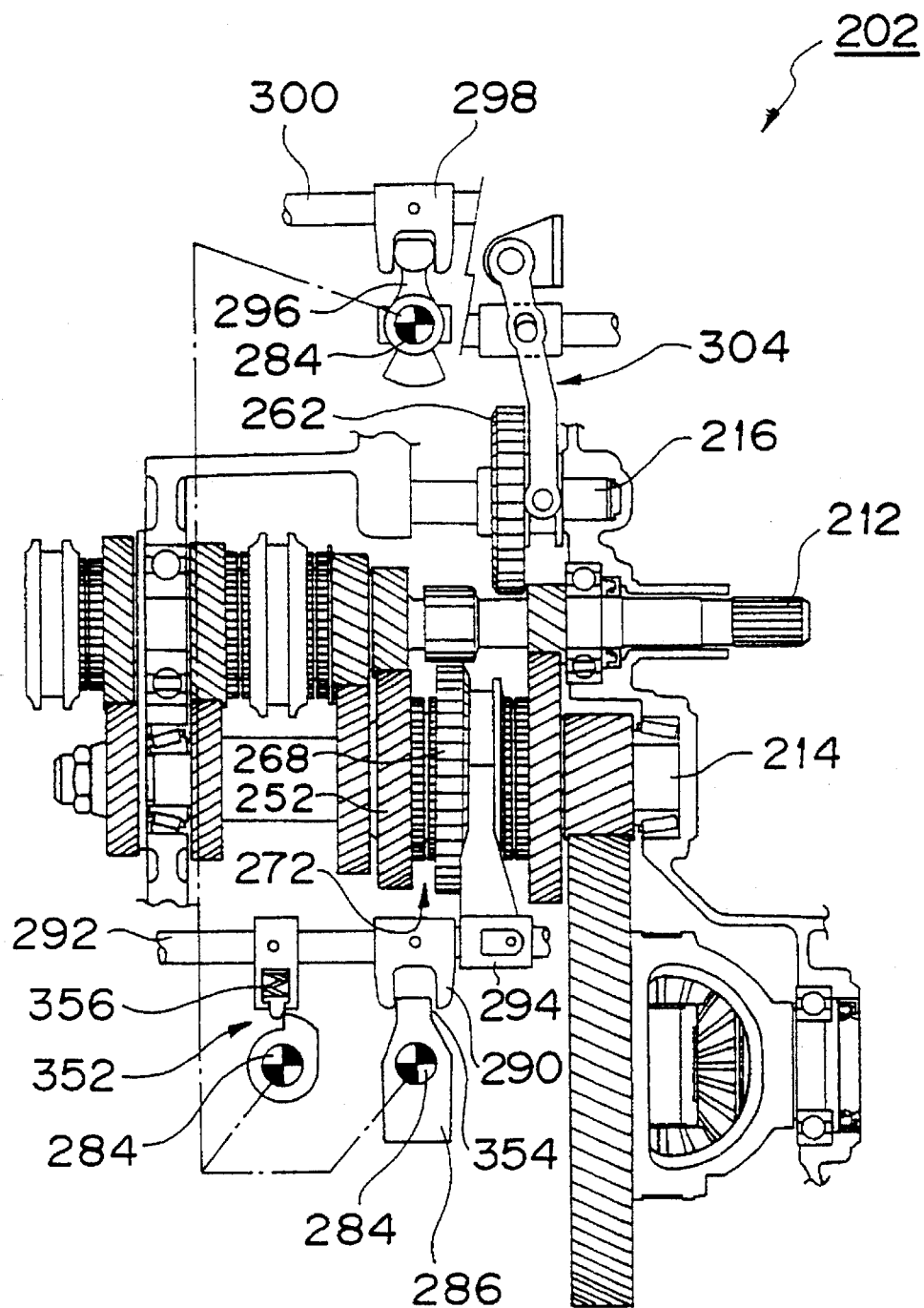
FIG. 25 is a structural view showing a prior art transmission which is provided with a conventional gear squeal-preventing mechanism.

For example, as illustrated in FIG. 21, the cam 180 can be configured to provide a beveled surface 182 in order to add a function of relief to the cam 180. The function of relief is useful for an operating time when the cam 180 is turned with respect to the pin 170. To be specific, the beveled surface 182 is provided for preventing both ends of the U-shaped cam 180 from being brought into angular abutment with the interlocking plate 88 during rotational movement of the cam 180.

According to the above example, abutment surfaces of the second return springs 122 can be directed in a direction perpendicular to the shifting and selecting shaft 86. As a result, the deflection of the second return springs 122 can be avoided. In addition, a state of the cam 180 in abutment with the interlocking plate 88 can be made to surface-to-surface abutment.

While the second speed-synchronizing mechanism 72 is employed as a forward state-synchronizing mechanism, other forward state-synchronizing mechanisms are usable.

Further, it is possible for the cam movement-beveled surface 172 to be provided to the cam 160 itself.

As evidenced by the above detailed description, in a reverse gear squeal-preventing device for a transmission according to one aspect of the present invention, a cam is mounted on a shifting and selecting shaft so as to be only rotatable with respect to a pin which is inserted through the shifting and selecting shaft. In addition, a cam top portion of the cam is brought into and out of engagement with a forward stage-shifting yoke. The shifting and selecting shaft is further provided with a spring for pressing and urging the cam toward an interlocking plate. As a result, during reverse shifting, a relationship to a forward stage-synchronizing mechanism is maintained and interrupted by the use of a change in an angle between the cam and the interlocking plate, the cam being rotated on the shifting and selecting shaft with respect to the pin. This construction can accommodate a quicker reverse-shifting operation, and can effectively prevent the occurrence of a gear squeal. Further, since a spring for selective return is usable, which is originally provided as a spring within the transmission of the type described herein, there is no need for addition of components except for the pin and the interlocking plate. The reverse gear squeal-preventing device is thereby simplified in construction, but is capable of preventing the gear squeal during reverse shifting. Furthermore, since neither extended shafts nor additional synchronizing or other gears are required, the transmission can be designed to have fewer components as well as a reduced overall size and lighter weight.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A reverse gear squeal-preventing device for a transmission having a main shaft, a counter shaft, a reverse idler shaft arranged substantially parallel to the main and counter shafts within a transmission case, said main shaft being provided with forward stage main gears and a reverse main gear, said counter shaft being provided with forward stage counter gears and a reverse counter gear, said reverse idler shaft being provided with a reverse idler gear, a shifting and selecting shaft controlled by a shift lever to provide axial movement at the time of selecting and pivotal movement at the time of shifting, said shifting and selecting shaft is provided with an interlocking plate for preventing malfunction and a forward stage-synchronizing mechanism which is actuated at the time of reverse shifting so as to prevent gear squeal, and wherein said reverse gear squeal-preventing device includes a cam mounted on said shifting and selecting shaft so as to be rotatable only with respect to a pin that is inserted through said shifting and selecting shaft, a cam top portion of said cam being brought into and out of engagement with a forward stage-shifting yoke, said shifting and selecting shaft being provided with a spring for pressing and urging said cam toward said interlocking plate, and a beveled surface provided at a side portion of said interlocking plate, and a single surface-engaging protrusion portion provided on a side surface of said cam for engaging said beveled surface.

* * * * *

UNITED STATES PATENT AND TRADEMARK OFFICE
CERTIFICATE OF CORRECTION

PATENT NO. : 5 515 742
DATED : May 14, 1996
INVENTOR(S) : Akira Ibusuki

It is certified that error appears in the above-indentified patent and that said Letters Patent is hereby corrected as shown below:

On title page, line 2; change "Ibushuki" to
---Ibusuki---.

On the title page, please change [75] Inventor to the following:
---[75] Inventor: Akira Ibusuki, Shizuoka, Japan---.

Signed and Sealed this

Nineteenth Day of November, 1996

Attest:

BRUCE LEHMAN

Attesting Officer　　　Commissioner of Patents and Trademarks